Figure 1:
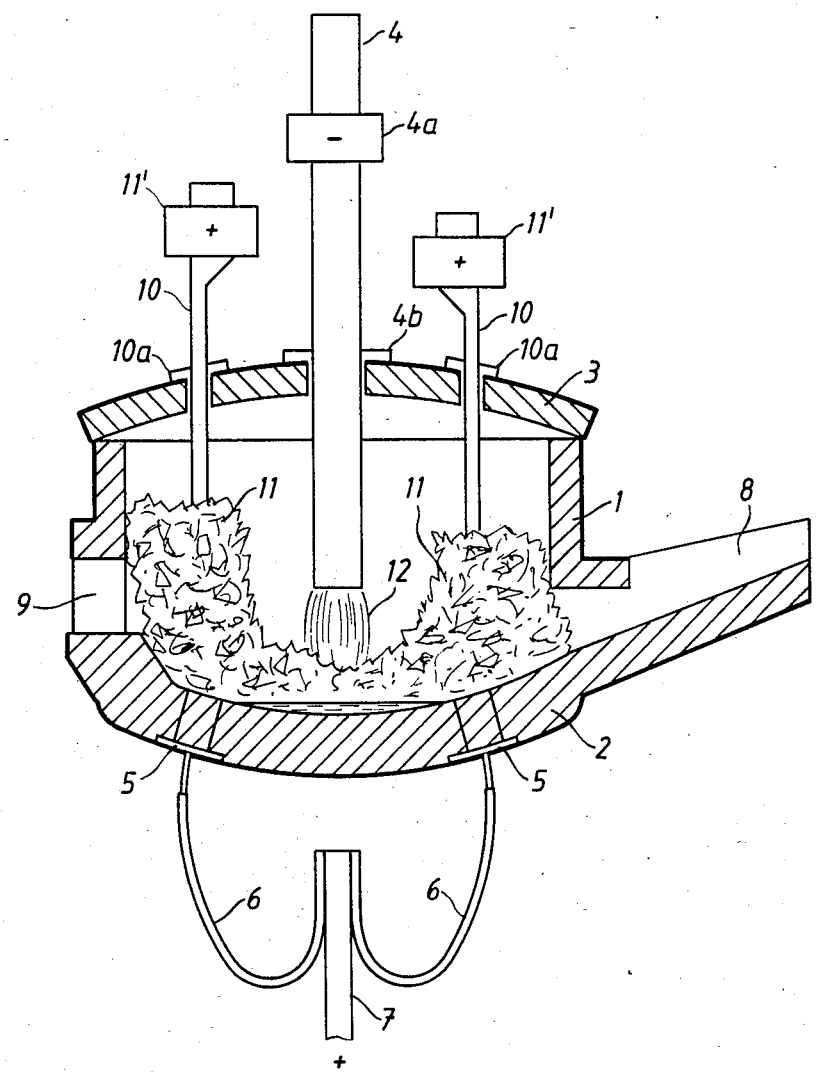

United States Patent [19]

Lassander et al.

[11] Patent Number: 4,606,055
[45] Date of Patent: Aug. 12, 1986

[54] DC ARC FURNACE HAVING STARTING EQUIPMENT

[75] Inventors: Erik Lassander, Viken; Sven-Einar Stenkvist, Västerås, both of Sweden

[73] Assignee: Asea AB, Västerås, Sweden

[21] Appl. No.: 639,145

[22] Filed: Aug. 9, 1984

[30] Foreign Application Priority Data

Aug. 12, 1983 [SE] Sweden ............................... 8304384

[51] Int. Cl.⁴ .............................................. H05B 7/00
[52] U.S. Cl. .................................................... 373/108
[58] Field of Search ................. 373/108, 102, 95, 103, 373/72

[56] References Cited

U.S. PATENT DOCUMENTS

| | | | |
|---|---|---|---|
| 3,835,230 | 9/1974 | Valchev et al. | 373/108 |
| 3,999,000 | 12/1976 | Stenkvist | 373/108 |
| 4,110,547 | 8/1978 | Peev et al. | 373/108 |
| 4,161,618 | 7/1979 | Stenkvist | 373/108 |

Primary Examiner—Roy N. Envall, Jr.
Attorney, Agent, or Firm—Kenyon & Kenyon

[57] ABSTRACT

A DC arc furnace including a hearth adapted to contain a melt and having a melt electrode which is only effective when covered by the melt, an enclosure for the hearth including a roof over the hearth, at least one arcing electrode depending downwardly through the roof and adapted to initially melt a charge of solid metal on the hearth and thereafter the resulting melt, and at least one starting electrode through which electric power is transmitted to the charge of solid metal until it is melted down by the arcing electrode to enough melt to cover the melt electrode; the starting electrode or electrodes depending downwardly through the roof at a position horizontally offset from the arcing electrode and being adapted to be moved downwardly so as to press on the charge of solid scrap on the hearth until the charge is melted down by the arcing electrode so as to cover the melt electrode and thereafter to be moved upwardly free from the charge.

3 Claims, 3 Drawing Figures

DC ARC FURNACE HAVING STARTING EQUIPMENT

A DC arc furnace characteristically has a hearth for containing a melt and a melt electrode through which electric power can be transmitted to the melt when formed on the hearth so as to cover the melt electrode. An enclosure for the hearth includes a roof over the hearth and through which at least one arcing electrode depends downwardly for initially melting a charge of solid metal on the hearth and thereafter heating the resulting melt.

When the hearth is initially charged with solid metal, normally scrap, the melt electrode is not covered by a melt and cannot transmit enough electric power through the scrap to the arc to initially melt the charge to form enough melt to cover the melt electrode to make it effective. Therefore, the furnace is provided with starting equipment in the form of a starting electrode consisting of a metal bar, normally copper, and which can be inserted through an opening in the side wall of the furnace. This starting electrode is mounted by apparatus beside the outside of the furnace and which is designed to move the starting electrode into and from the furnace and while in the furnace to press the starting electrode against the scrap so as to establish a good electrical connection. The DC power connections are made so that the arcing electrode operates cathodically and the melt electrode and the starting electrode operate anodically, the starting electrode being withdrawn from the furnace after the arc initially forms enough melt for the melt electrode to become effective.

The melt electrode can be formed by the hearth having electric conductors extending through it as exemplified by U.S. Pat. No. 4,228,314. An example of prior art starting equipment is provided by U.S. Pat. No. 4,024,337.

To carry the current required by the arc during the initial meltdown the starting electrode must be of large diameter and because of its weight requires an actuating apparatus of considerable bulk, it occupying an undesirable amount of plant space beside the furnace. Usually the furnace is of the tilting type requiring complete removal of the starting electrode, so its actuating apparatus must be capable of this function and therefore complicated.

The present invention comprises a furnace construction wherein the starting electrode depends through the roof much like the arcing electrode does but horizontally spaced from the arcing electrode. More precisely at least two starting electrodes are positioned to depend through the furnace roof and they are preferably arranged symmetrically with respect to the arcing electrode. Using two starting electrodes they may each be made of smaller diameter than is required by only one to carry the electric power required to power the arcing electrode, the two starting electrodes being electrically interconnected in parallel so that together they carry the electric power. The arcing electrode customarily is carried by an electrode arm above the furnace and extending from a mast provided with equipment for lowering and raising the arm and therefore the arcing electrode, the arcing electrode depending through the furnace roof via a substantially gas-tight seal in which the arcing electrode slides vertically. Substantially the same type of equipment can be used for each of the vertically depending starting electrodes.

A three-phase AC furnace already has the three vertically movable electrode arms and by rebuilding its hearth so that it functions as the melt electrode, one of its electrode arms can be used to mount the arcing electrode while the two other arms are used to mount the two starting electrodes depending through the furnace roof via the seals.

In the foregoing way the invention eliminates all starting electrode manipulating equipment that would otherwise be required beside the furnace so as to take up plant space. Being of small diameter the two starting electrodes need not be very heavy and their electrode arms and the masts from which these arms extend need not be made as strong as the mast and electrode arm of the arcing electrode.

Figure 2:
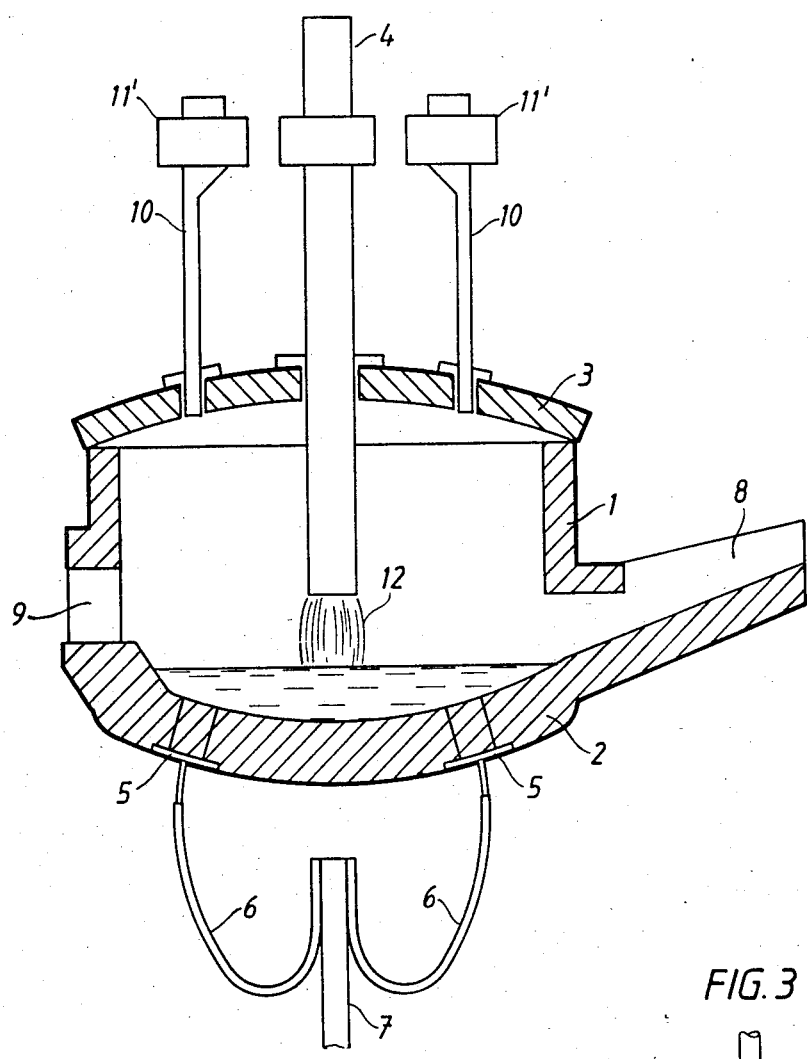
Figure 3:
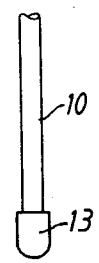

An embodiment of the invention is described below with the aid of the accompanying drawings, in which:

FIG. 1 in vertical section schematically shows the embodiment, the starting electrodes being shown pressing down on a scrap charge in the furnace;

FIG. 2 is the same as FIG. 1 but shows the starting electrodes raised after performing their function; and FIG. 3 shows how the starting electrodes can be provided with graphite tips.

The drawings show a typical DC arc furnace with its side wall 1, hearth 2 and roof 3. The arcing electrode 4, which can be of the graphite or Soderberg type, is shown suspended from its electrode arm 4a and depending through the arcing electrode opening in the roof 3, via the usual gas-tight seal 4b. The melt electrode is represented rather schematically at 5 with its terminals connected via flexible cables 6 with the positively connected bus bar 7 and is operated anodically, the arcing electrode 4 functioning cathodically. The furnace is of the usual tilting type with the flexible cables 6 providing for the furnace movement. The furnace has a pouring spout 8 extending in the tilting direction of the furnace, while a slag removal port 9 is shown opposite to the pouring spout.

Spaced on either side of the arcing electrode, the starting electrodes 10 depend through their corresponding gas-tight seals 10a with, in FIG. 1, their lower ends pressed downwardly on the scrap piled at 11, the arc 12 starting the initial meltdown in FIG. 1. The starting electrodes depend from their electrode arms 11' and although not shown it is to be understood that these arms extend from their masts which can correspond to the usual arcing electrode mast. The starting electrodes are pressing down on the scrap 11 with enough pressure to establish good electrical contact. It is to be understood that the two starting electrodes 10 are electrically interconnected to operate in parallel and that they operate anodically as does the melt electrode connection.

FIG. 2 shows how both starting electrodes can be raised clear from the furnace interior after the arc 12 has formed enough melt to make the melt electrode or connection arrangement fully effective. The starting electrodes are made long enough so that they need not be removed from their seals 10a, the roof remaining gas-tight. Although not shown such an arc furnace normally has an outlet for gases formed inside of the furnace and which should be kept from polluting the atmosphere. The two starting electrodes of small diameter can be solid copper bars preferably having graphite 13 as illustrated by FIG. 3.

What is claimed is:

1. A DC furnace including a hearth for containing a melt and having at least one melt electrode which becomes effective when covered by a melt, an enclosure for the hearth including a roof over the hearth, at least one arcing electrode depending downwardly through the roof for melting a charge of solid metal on the hearth, and at least two starting electrodes through which electric power is transmitted to the charge of solid metal until it is to cover the melt electrode, the starting electrodes depending downwardly through the roof and being horizontally offset from the arcing electrode and moved to downward positions to press on the charge of solid scrap on the hearth until the charge is melted down to cover the melt electrode and thereafter moved to upward positions clear from the furnace interior, said starting electrodes being made of metal and each being of smaller diameter than is adequate to singly carry the electric power required to power the arcing electrode, the starting electrodes being electrically interconnected in parallel so that together they can carry said power, the roof having substantially gas-tight seals through which the starting electrodes vertically slidingly depend, and said starting electrodes being long enough to remain in said seals when the starting electrodes are slid to their said upward positions.

2. The furnace of claim 1 in which each starting electrode depends from a vertically movable electrode arm positioned above the roof.

3. The furnace of claim 2 in which the furnace is mechanically designed as a three-phase AC furnace having three vertically movable electrode arms, said arcing electrode depending from one of these arms and the two starting electrodes depending from the other two arms.

* * * * *